May 9, 1967 N. C. LEE 3,318,614

WHEEL PEDAL TOY

Filed May 13, 1965

INVENTOR.
Norman C. Lee
by L. Lee Helms

ATTORNEY.

United States Patent Office 3,318,614
Patented May 9, 1967

---

3,318,614
WHEEL PEDAL TOY
Norman C. Lee, Rocky Mount, N.C., assignor to Empire Plastic Corporation, New York, N.Y., a corporation of New York
Filed May 13, 1965, Ser. No. 455,570
1 Claim. (Cl. 280—221)

The object of the present invention is to provide a toy for children, requiring the use of balance and skill, and which is of such form that except for two crank shafts, the elements may be made of molded plastic, particularly the wheels, and in such manner that stresses upon the plastic wheels are thrown beyond the crank shaft ends and in a lateral direction with respect to each wheel. This is accomplished by making each crank shaft virtually a rigid unitary member of two opposed wheels. In other words, the wheels do not rotate relatively to the crank shafts, and each crank shaft carries a metallic plate sunk into a recess of the wheel adjacently, and this arrangement is for each end of the crank shaft.

The invention will be described with reference to the accompanying drawings, in which.

Figure 1:
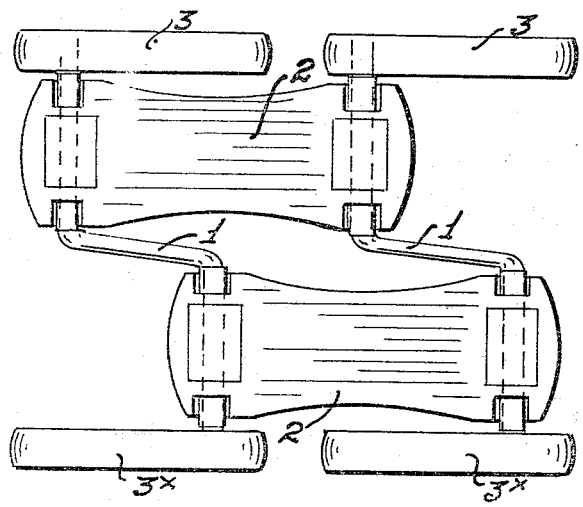
FIG. 1 is a plan view showing an embodiment of the invention.

Referring to the drawings, it will be seen that two crank shafts 1 are employed, and it will be assumed that in the position of the crank shafts shown in that figure, the lie horizontally and that they support two pedals 2 in horizontal position. The ends of each crank shaft pass through relatively thick areas of the pedal members 2 transversely thereof as shown in FIG. 3. A set of wheels 3 and $3^x$ is provided for each pedal member. Each crank shaft outer area enters the thickened aperture at an end area of the opposed pedal member, and preferably the outer end of each crank shaft is squared, as indicated at $1^x$, FIG. 2, so that the squared aperture of a plate 4 may be secured to said squared area of the crank shaft and rotate therewith. When one of the wheels is placed upon any one of the crank shaft projecting ends, the appropriate plate 4 will be received in a recess in the inner face of the wheel, which recess is of the same area and shape as the plate. Although each plate may be driven onto a squared outer end of the appropriate crank shaft in such manner as to have a frictional hold thereon, the plate in each case may be welded in position on the shaft end, if desired.

Figure 2:
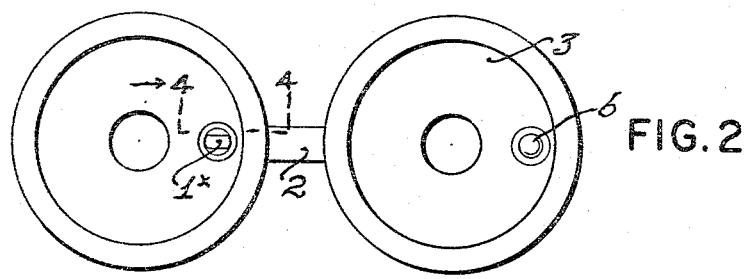
FIG. 2 is a side elevation of the structure shown in FIG. 1.
Figure 4:
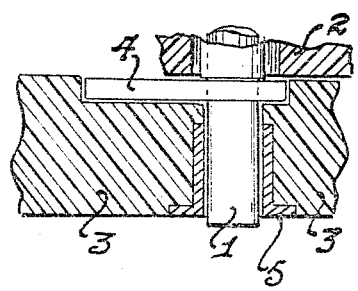
FIG. 4 is an enlarged fragmentary horizontal cross-section taken on the line 4—4, FIG. 2.
Figure 3:
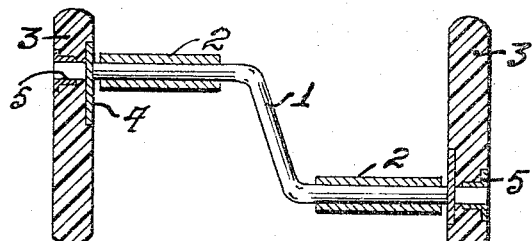
FIG. 3 is a transverse section looking in the direction of the arrows of FIG. 1.

In the embodiment illustrated, the shaft receiving aperture of each wheel receives a bearing member 5, but inasmuch as each wheel is virtually a part of the shaft and rotates only therewith, such a bearing member is not essential, but serves as an abutment for a suitable stop member, which may be a cotter pin (not shown), or a stop cap as schematically indicated at 6 in FIG. 2.

In operation, when the user stands upon the pedals in position of FIG. 1 and throws his weight on the upper pedal at its left hand end, that pedal will descend, the lowermost pedal will rise. When the lowermost pedal has thus been brought to its raised position, the weight of the user thrown to the left thereof, will cause a reverse action and the wheels will be repeatedly rotated, because they are forced to follow the rotary movements of the cranks. In this manner, the device is moved forwardly or backwardly, as its user desires. By the simple means of plate connection between the crank shafts and the wheels, the latter may have long wear at the driving areas, although made of plastic and the construction as a whole is simple, strong, and inexpensive.

It will be understood that various modifications may be made in the form and arrangement of the elements.

Having described my invention, what I claim and desire to secure by Letters Patent, is as follows:

A wheel pedal toy comprising two spaced crank shafts, each with two crank areas extending in opposite directions, two pedals connecting the crank areas of one crank shaft with the opposite crank areas of the second crank shaft, a pair of wheels for each crank shaft, the ends of each crank shaft being formed out-of-round, two plates for each crank shaft and received by the latter at its ends, each plate having a shaft receiving aperture conforming with said out-of-round shape, each plate being embedded into a recess of an appropriate wheel, whereby the wheel is so connected to an end of the appropriate crank shaft as to follow its movements, the said connections between the crank shafts and the wheels being disposed eccentrically of the axis of each wheel.

References Cited by the Examiner
UNITED STATES PATENTS

| | | | |
|---|---|---|---|
| 605,028 | 5/1898 | Strecker | 280—229 |
| 1,420,791 | 6/1922 | Wagner | 280—229 |
| 1,533,824 | 5/1925 | Benjamin | 280—221 |
| 3,107,926 | 10/1963 | Verge | 280—259 X |

OTHER REFERENCES

Playthings Magazine, October 1961, p. 82.

KENNETH H. BETTS, *Primary Examiner.*